United States Patent

[11] 3,618,036

[72] Inventor Robert L. Carbrey
Colts Neck, N.J.

[21] Appl. No. 784,646
[22] Filed Dec. 18, 1968
[45] Patented Nov. 2, 1971
[73] Assignee Bell Telephone Laboratories, Incorporated
Murray Hill, N.J.

[54] INTERLACED COUNTING CIRCUITS
16 Claims, 3 Drawing Figs.

[52] U.S. Cl. .......... 340/172.5, 235/92, 307/225
[51] Int. Cl. .......... G06f 9/00
[50] Field of Search .......... 340/172.5; 235/157, 92; 307/225

[56] References Cited

UNITED STATES PATENTS

| | | | |
|---|---|---|---|
| 2,602,140 | 7/1952 | Fink | 235/92 |
| 2,888,557 | 5/1959 | Schneider | 235/92 |
| 2,935,685 | 5/1960 | Schneider | 235/92 |
| 3,443,070 | 5/1969 | Derby et al. | 235/92 |
| 3,310,660 | 3/1967 | Cogar | 307/225 |
| 3,379,897 | 4/1968 | Kaminski | 307/225 |
| 3,382,375 | 5/1968 | Dischert | 307/225 |

*Primary Examiner*—Paul J. Henon
*Assistant Examiner*—Mark Edward Nusbaum
*Attorneys*—R. J. Guenther and Kenneth B. Hamlin

ABSTRACT: A circuit is described for coordinating the addressing of a plurality of tap multipliers in a transversal filter, which is employed as a pre-equalizer with a received data stream. The data stream updates information stored in a memory. The updated information is applied to the tap multipliers at a rate eight times the rate that the data stream updates the memory. A memory and tap address counter, operating at a rate that the information is applied to the taps is synchronized with the updating data stream by causing the address counter to slip one count for each cycle thereof.

INVENTOR
R.L. CARBREY
BY
ATTORNEY

FIG. 3

| TAP # | MEMORY & TAP ADDRESS COUNTER | TAP # | MEMORY & TAP ADDRESS COUNTER | TAP # | MEMORY & TAP ADDRESS COUNTER | TAP # | MEMORY & TAP ADDRESS COUNTER |
|---|---|---|---|---|---|---|---|
| 1 | 8 | 33 | 6 | 65 | 4 | 97 | 2 |
| 2 | 16 | 34 | 14 | 66 | 12 | 98 | 10 |
| 3 | 24 | 35 | 22 | 67 | 20 | 99 | 18 |
| 4 | 32 | 36 | 30 | 68 | 28 | 100 | 26 |
| 5 | 40 | 37 | 38 | 69 | 36 | 101 | 34 |
| 6 | 48 | 38 | 46 | 70 | 44 | 102 | 42 |
| 7 | 56 | 39 | 54 | 71 | 52 | 103 | 50 |
| 8 | 64 | 40 | 62 | 72 | 60 | 104 | 58 |
| 9 | 72 | 41 | 70 | 73 | 68 | 105 | 66 |
| 10 | 80 | 42 | 78 | 74 | 76 | 106 | 74 |
| 11 | 88 | 43 | 86 | 75 | 84 | 107 | 82 |
| 12 | 96 | 44 | 94 | 76 | 92 | 108 | 90 |
| 13 | 104 | 45 | 102 | 77 | 100 | 109 | 98 |
| 14 | 112 | 46 | 110 | 78 | 108 | 110 | 106 |
| 15 | 120 | 47 | 118 | 79 | 116 | 111 | 114 |
| 16 | 128 | 48 | 126 | 80 | 124 | 112 | 122 |
| 17 | 7 | 49 | 5 | 81 | 3 | 113 | 1 |
| 18 | 15 | 50 | 13 | 82 | 11 | 114 | 9 |
| 19 | 23 | 51 | 21 | 83 | 19 | 115 | 17 |
| 20 | 31 | 52 | 29 | 84 | 27 | 116 | 25 |
| 21 | 39 | 53 | 37 | 85 | 35 | 117 | 33 |
| 22 | 47 | 54 | 45 | 86 | 43 | 118 | 41 |
| 23 | 55 | 55 | 53 | 87 | 51 | 119 | 49 |
| 24 | 63 | 56 | 61 | 88 | 59 | 120 | 57 |
| 25 | 71 | 57 | 69 | 89 | 67 | 121 | 65 |
| 26 | 79 | 58 | 77 | 90 | 75 | 122 | 73 |
| 27 | 87 | 59 | 85 | 91 | 83 | 123 | 81 |
| 28 | 95 | 60 | 93 | 92 | 91 | 124 | 89 |
| 29 | 103 | 61 | 101 | 93 | 99 | 125 | 97 |
| 30 | 111 | 62 | 109 | 94 | 107 | 126 | 105 |
| 31 | 119 | 63 | 117 | 95 | 115 | 127 | 113 |
| 32 | 127 | 64 | 125 | 96 | 123 | 128 | 121 |

INTERLACED COUNTING CIRCUITS

FIELD OF THE INVENTION

This invention relates to a circuit for synchronizing a memory address counter, in a digital preequalizer, with a received stream of updating data and particularly to such a circuit in which the stored data is called up from memory more often than updating data is received.

BACKGROUND OF THE INVENTION

A preequalizer is a device which distorts a data signal before transmission over a signal-distorting transmission medium. The predistortion is adjusted so that the data signal arriving at a receiving terminal resembles the undistorted signal. In an automatically or adaptively adjusting preequalizer, the data arriving at the receiving terminal is compared with an ideal data signal to derive adjusting signals. The adjusting signals for the preequalizer are sent back to the transmitting terminal via a low-frequency channel.

When a multitap transversal filter type of preequalizer is employed, a system similar to the one disclosed in U.S. Pat. No. 3,368,168 entitled "Adaptive Equalizer for Digital Transmission Systems Having Means to Correlate Present Error Component with Past, Present and Future Received Data bits," which issued to R. W. Lucky on Feb. 6, 1968, may be employed at the receiving terminal to derive information for adjusting each tap. This information indicates whether the adjustment of a particular tap should be in one direction or the other. This change information for each tap may be sequentially sampled and coded at the receiving terminal and set back to the transmitting terminal. Framing pulses would be inserted to indicate the start of each sequence.

At the transmitting terminal, a counting circuit would be synchronized with the framing pulses. The synchronized counter circuit may be employed to address a digital memory for sequentially calling up stored information indicating the setting of a particular tap. If a change is indicated, the information would be modified and set back to memory. When the information is called up, it could also be decoded to generate an analog tap setting signal for the appropriate tap. The counting circuit would also be employed to control a tap selection matrix for steering the analog tap setting signal to the appropriated tap.

At each tap of the preequalizer, the appropriate analog tap setting signal would be multiplied by the data signal to be transmitted to provide product signals which would be added together resulting in the predistorted data signal. Typically, this analog tap setting signal is stored as a voltage on a capacitor between applications of updated information.

In one transversal filter preequalizer, 128 taps are employed. Updating information for each tap is received 14 times a second. It has been found that the voltages stored on the capacitors tend to leak off at too high a rate unless unduly large capacitors are employed. Therefore, it has been found necessary to bring up the stored data from memory to charge the capacitors at a rate greater than updating information is received.

A straightforward way to synchronized the calling up of the data from the memory at the higher rate would be to operate a first counter at a multiple of the rate at which updating data is received and a second counter at the rate of the updating data. The higher speed counter circuit would be used to address the memory and the tap selection matrix. In this way, the analog tap setting signals can be applied to the capacitor more often than information is received.

This scheme has one inherent difficulty. If, for examples, the higher speed counter is operating at a rate eight times that of the lower speed counter, the higher speed counter would always be at the same one-eighth of its counts when updating data was received. It would be necessary, therefore, to employ the lower speed counter to address the memory and tap selection matrix when updating data arrives. Such a system requires extensive additional circuitry to coordinate the two counters.

BRIEF DESCRIPTION OF THE INVENTION

In accordance with the present invention, a first counter circuit is employed for dividing down a pulse train by a first factor. A second counter is employed for counting down the pulse train by a second factor which is less than the first factor. The output signal from the first counter is employed to reset the second counter to a predetermined count while the output from the second counter is employed to inhibit the second counter for one count. In this way, the second counter is made to slip one count for each of its cycles insuring that the second counter will be at a unique count for each count of the first counter. In this way, the second counter may be employed for addressing purposes without additional circuitry.

In one embodiment, the first counter is phase locked to an incoming stream of control data by a framing circuit. A logic circuit is employed to decode the received data to provide count-up, countdown, or hold information. The second counter circuit is employed to address both a memory where tap-setting information is stored and an equalizer tap. Each time the memory is addressed, an analog signal is applied to a tap. IF change information is present, the data is updated and returned to the memory.

DESCRIPTION OF THE FIGURES

FIG. 3 is a table showing the count of the addressing counter used to access each tap of a preequalizer.

DETAILED DESCRIPTION

Figure 1:
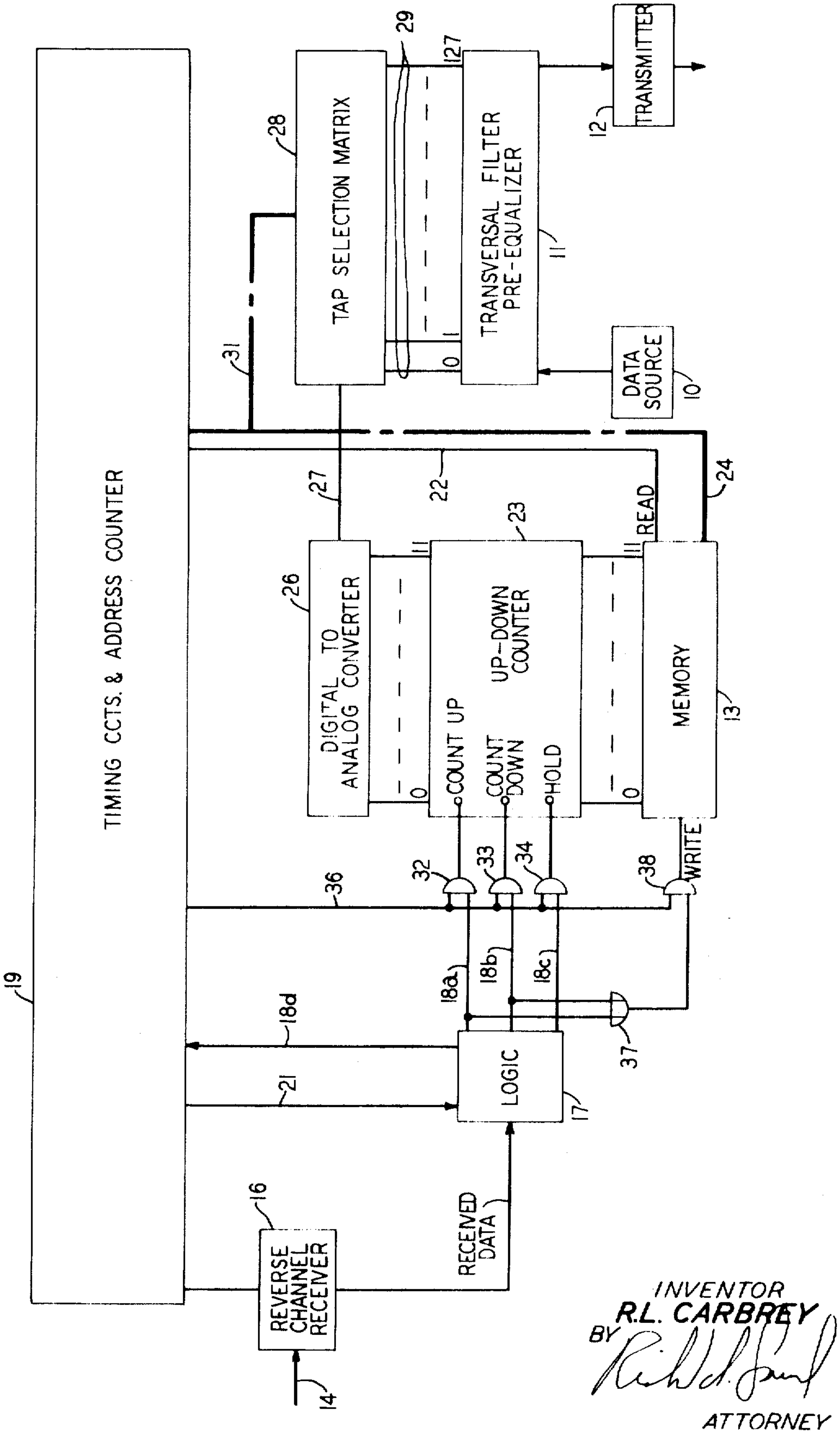
FIG. 1 is a block diagram showing a transmitting terminal employing a transversal filter preequalizer in which this invention is utilized.

FIG. 1 shows equipment located at a data transmission terminal which employs an adaptively adjustable preequalizer. A data signal from a data source 10 is shaped by the transfer characteristic of a transversal filter preequalizer 11 and applied to a transmitter 12 for transmission to a remote receiving terminal, not shown. The transversal filter preequalizer 11 is a conventional multitap transversal filter such as the one disclosed in the above-mentioned Lucky patent. It should be understood that either a digital or analog tap equalizer may be employed without departing from the invention. The adaptive adjusting circuits disclosed therein for generating a plurality of differential adjusting signals, one differential adjusting signal for each tap of the equalizer 11, are located at the receiving terminal. The relative values of the settings for each tap, which are modified by the differential adjusting signals, are stored in a memory 13 at the transmitting terminal.

The differential adaptive signals at the receiving terminal are sequentially sampled providing a signal format in which a two-bit start-of-frame signal, for example, two logical ONE's, is followed by a stream of two-bit differential adjusting signals, indicating change information for each tap in sequence.

The stream of data is transmitted over a low speed reverse channel back to the transmitting terminal and applied to an input lead 14 of a reverse channel receiver 16. The receiver 16 applies the data stream to a logic circuit 17 which decodes the two-bit start and adjusting signals in the received data to provide signals indicating count-up, countdown, hold, or start of frame on leads **18*a*, 18*b*, 18*c*, and 18*d*, respectively. The four types of signals on the four leads 18*a* through 18*d*, respectively, correspond to the four possible binary states, respectively, of a two-bit digital signal. Consequently, logic 17** advantageously comprises coincidence decoding logic of a type well known in the art and including register stages presenting the two-bit signals in bit-parallel format and coincidence gates deriving the respective binary combinations from that format. An example of this type of logic is found in FIG. 24 of the F. S. Farkas et al. U.S. Pat. No. 3,248,693 wherein the gate 617 is responsive to a predetermined combination of binary ONE and ZERO outputs of the stages of a register upon the occurrence of a binary ONE in the "DEMOD. STARTS" input circuit. applied to the proper tap in the transversal filter preequalizer 11 by one of a plurality of leads 29, one for each tap, as directed by the signal on leads 24 provided to the tap selection matrix 28 by leads 31.

In this way, tap-setting information digitally stored in the memory 13 is sequentially applied to individual taps in the transversal filter preequalizer 11 in analog form. The analog signals are stored on capacitors in each tap circuit between applications of the analog signal. Three gate circuits 32, 33, and 34 are periodically enabled by a timing signal on lead 36 to increment or decrement the counter 23 and thereby update the information in the up-down counter 23 for application to the tap. The coordination of the timing circuits and address counter 19 with the framing signal on lead 18*d* insures that the change information supplied by gates 32, 33, and 34 is applied to the proper information temporarily stored in the up-down counter 23. If the information in the counter is changed, an OR gate 37 applies a signal to a gate 38 to update the information in the memory 13.

If the taps in the transversal filter preequalizer 11 were supplied with the adjusting signals at the same rate that updating information was received, a simple counting circuit could be synchronized with the received data and employed to address the memory and the tap selection matrix. It has been found, however, that with available data transmission systems, and existing electronic components, charges stored on the capacitors in the tap setting circuits decay at too high a rate to insure proper equalization. Therefore, it has been found necessary to apply analog adjusting signals to the taps in the preequalizer 11 at a higher rate than updating data is received.

Figure 2:
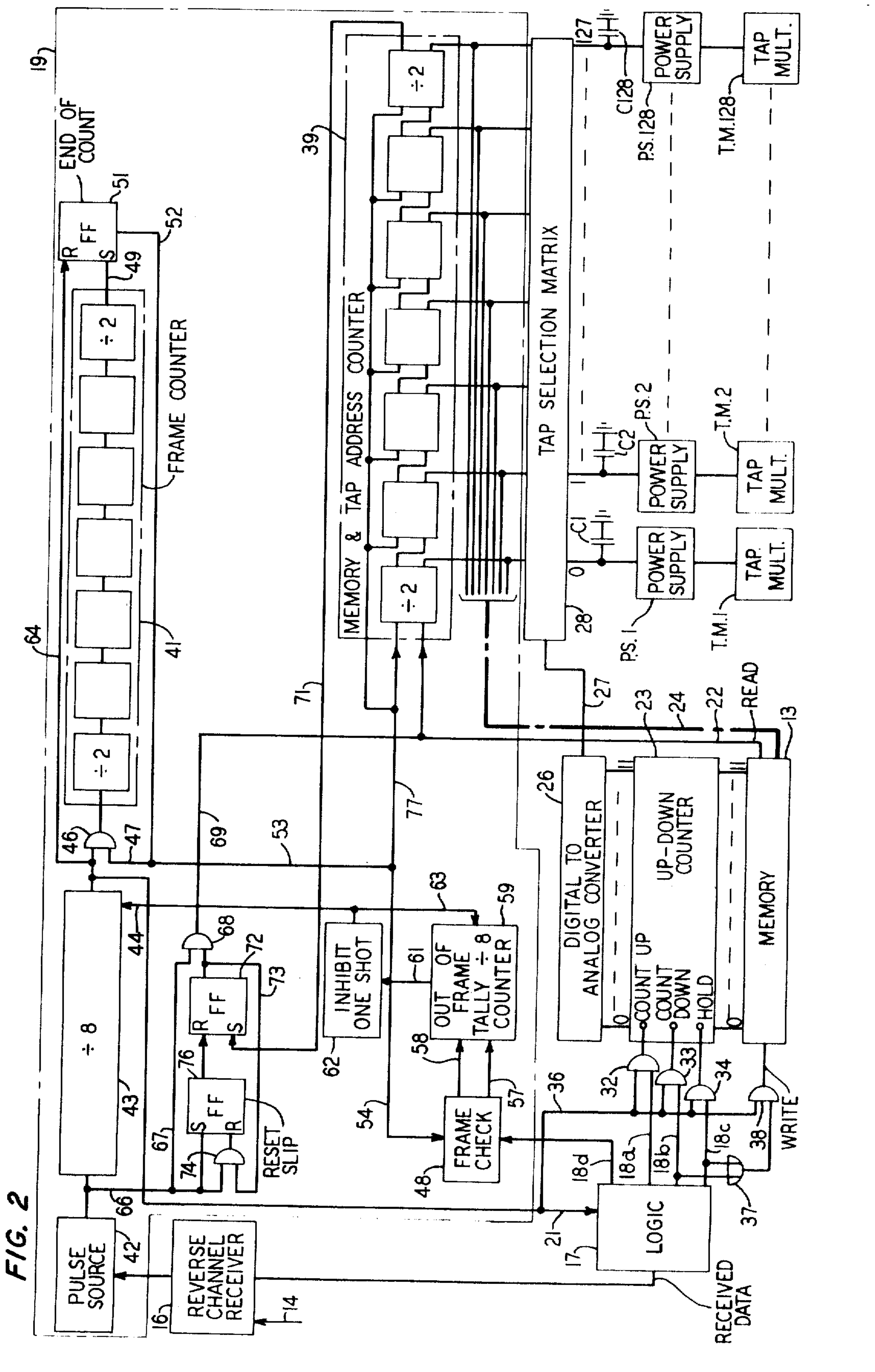
FIG. 2 is a block diagram showing a system embodying the principles of this invention.

A more detailed block schematic of timing circuit and address counter 19 of FIG. 1 is shown in FIG. 2 (enclosed in dashed line). Other elements of the transmitting terminal of FIG. 1 are repeated in FIG. 2 with corresponding designations. FIG. 2 illustrates the circuit for synchronizing a memory address counter 39 at the transmitting station with the stream of updating data received at the input terminal 14. The address counter 39 is operated at a rate eight times the rate of received data. A frame counter 41, operating at the rate of the received data, is synchronized with the received data and coordinates the operation of the address counter 39.

a. Frame Synchronization

A pulse source 42 provides a stream of pulses having a repetition rate fixed with respect to the received data rate. The repetition rate of the pulses provided by pulse source 42 is equal to eight times the rate at which data is received. For purposes of this discussion, the term data rate shall refer to the rate at which data words each comprising two data bits are received. A frame in the present system includes 129 data words.

The pulse train from source 42 is divided down by a factor, for example, of eight in a divide-by-eight, i.e., frequency-dividing, circuit 43 and by an additional factor of 128 by the frame counter 41 for frequency dividing the output of circuit 43. The divide-by-eight circuit 43 may be inhibited from counting by application of a signal on an inhibited input 44. The output from divide-by-eight circuit 43 is passed to the frame counter 41 by a gate 46 having a second input 47 for inhibiting the passage of the output signal from the divide-by-eight circuit 43 to the frame counter 41.

The output from the divide-by-eight circuit 43 is a signal having a repetition frequency equal to the received data rate. The signal is applied by the lead 21 to the logic circuit 17. The received data signal from the receiver 16 is applied as a second input to the logic circuit 17. Each two-bit data word is decoded by the logic circuit 17 to provide the signals on output leads 18*a*, 18*b*, 18*c*, or 18*d*, respectively, indicating count-up, countdown, hold or frame check, respectively.

A frame check signal appearing on lead 18*d* once every 129th data word is applied to a frame check circuit 48. The frame counter 41 will provide an output pulse on a lead 49 for each 128 pulses applied thereto. The pulse on the lead 49 sets an end-of-count flip-flop 51 to provide a frequency division of the output of counter 41. The output from the flip-flop 51 is applied by leads, 52, 53, and 54 as a second input to the frame check circuit 48. If the signal from the end-of-count flip-flop 51 is coincident with the frame check signal on lead 18*d*, an output pulse appears on reset lead 57 of the frame check circuit 48. If a signal appears on either lead 18*d* or 54 without the other, a count signal is applied to an output lead 58 of the frame check circuit 48.

The count signal on lead 58 advances an out-of-frame tally divide-by-eight counter 59 one count. If any signals appear simultaneously on lead 18*d* and 54 before eight count pulses are applied to out-of-frame tally divide-by-eight counter 59, a reset signal appearing on lead 57 resets the out-of-frame tally divide-by-eight counter 59 to zero. If, however, no reset pulse appears before eight count pulses are applied by lead 58 to counter 59, a pulse is applied by lead 61 to inhibit one shot multivibrator 62.

The one-shot multivibrator 62 provides a pulse to inhibit input 44 of divide-by-eight counter 43 causing that counter to slip one pulse. The output from inhibit one-shot multivibrator 62 is also applied by a lead 63 to reset the out-of-frame tally divide-by-eight counter 57 to the count of seven. In this way, once eight count signals appear on lead 58, the divide-by-eight counter 43 is caused to slip one pulse for each succeeding counter signal on lead 58 until the end-of-count flip-flop 51 is triggered at the same time a frame check signal is received indicating that the frame counter is in sync with the received data stream. A reset pulse is then generated on lead 57 resetting the out-of-frame counter 59 to zero. Before the inhibit one shot 62 is again activated, eight count signals must be provided by the frame check circuit 48. In this way, a spurious out-of-frame indicator will not upset the sync relationship.

The use of the out-of-frame counter 59 also allows a limited amount of auxiliary signaling over the return channel by arbitrarily converting the frame check signal to any one of the other three two-bit combinations or by converting the tap setting data pairs to a frame check indication. These spurious signals can be decoded by additional logic circuitry to perform certain common functions. For example, the granularity of the up-down counter 23 can be changed by one of these commands by inserting the count-up or countdown signals to a different stage in the up-down counter 23. Preset tap-setting configurations stored in the memory can be substituted for existing tap setting information either as an initial setting or if it is found that the equalizer is not converging. In this way, control algorithms, which are not always convergent, may be employed.

The output signals from the end-of-count flip-flop 51 is also applied by lead 52 to the inhibit input 47 of the gate 46. A lead 64 connects the output of divide-by-eight circuit 43 to a reset input of the end-of-count flip-flop 51 so that it is reset one pulse after it is set. The frame circuit 41, together with the end-of-count flip-flop 51, therefore provides a divide-by-129 circuit, frame synchronized with the received data.

b. Word Synchronization

Only the pertinent parts of the transversal filter preequalizer 11, shown in FIG. 1, are included in FIG. 2. A plurality of tap multipliers, $TM_1$ through $TM_{128}$, each having a data signal input, not shown, and an output, not shown, are driven at an adjusting input by a voltage controlled power supply $PS_1$ through $PS_{128}$, respectively. The voltage for controlling the output of each power supply is stored on a capacitor $C_1$ through $C_{128}$, respectively. The capacitors $C_1$ through $C_{128}$ are periodically charged by the analog voltage from digital-to-analog converter 26 supplied through the tap section matrix 28.

The pulse from pulse source 42 is applied by leads 66 and 67, normally enabled gate 68, and lead 69 to the memory and address counter 39. Each time a pulse from pulse source 42 advances the memory and tap address counter 39 one count, the read pulse on line 22 brings a digital word from memory 13 into the up-down counter 23 to supply a analog signal through digital-to-analog converter 26, lead 27 and tap selection matrix 28 to the appropriate capacitors $c_1$ through $C_{128}$.

For each output pulse from divide-by-eight counter 43, updating information is decoded by logic circuit 17 for changing information then in the up-down counter 23. The updating information for tap $TM_1$ is received when the memory and tap address counter 39 is at counter eight. The eighth count of the memory and tap address counter 39 is, therefore, decoded by a tap selection matrix 28 to apply the analog signal then present to the first capacitor $C_1$ and therefore the first tap $TM_1$ of the transversal filter preequalizer 11. In a like manner, the second capacitor $C_2$ (see FIG. 3) is selected by count 16 of the memory and tap address counter 39. Each eighth count selects the next tap until the 128th count selects tap 16. It should be apparent that there is no necessity to alter the selection matrix in memory 13 since it does not matter at what address in the memory information is stored. The only criterion is the same information is called up each time a particular tap is accessed.

If the memory and tap address counter 39 were to continue counting at the same rate, it is apparent that received data would be decoded when the counter 39 was at the same 16 counts. The received change information would be meaningless and would not be coordinated with the appropriate taps.

Therefore, the 128th count of the memory and tap address counter 39 is employed to cause the counter 39 to slip one count. A lead 71 applies the 128th count to set the flip-flop 72. The output from the flip-flop 72 inhibits the signal from pulse source 42 on lead 67 from passing through gate 68. The output signal from flip-flop 72 is also applied by a lead 73 to enable normally disabled gate 74. The next pulse from pulse source 42 resets the flip-flop 76, the output of which resets flip-flop 72 thereby again enabling gate 68 to pass the pulse from pulse source 42.

In this way, one pulse from pulse source 42 has been prevented from advancing the memory and tap address counter 39. Therefore, the next time divide-by-eight counter 43 enables logic circuit 17 to provide an updating data word, the memory and tap address counter 39 (see FIG. 3) will be at count 7. Count 7 is decoded by tap selection matrix 28 to gate the adjusting signal at tap 17. Each eighth count, when updating is received, the updating information is applied to the next tap multiplier, as shown in the table of FIG. 3. This process is repeated until the end-of-count flip-flop 51 is triggered. When the end-of-count flip-flop 51 is reset, a pulse is applied by lead 77 to reset the memory and tap address counter 39 to zero. However, the memory and tap address counter 39 will normally be at zero. By inhibiting the memory and tap address counter 39 once for each cycle thereof, a unique count is reached for each received data word in the frame. During the seven intermediate counts while updating data is not received, the capacitors $C_1$ through $C_{128}$ are recharged by the data stored in the memory 13.

It is to be understood therefore that the above-described arrangements are illustrative of the application of the principles of the invention. Numerous other arrangements may be devised by those skilled in the art without departing from the spirit and scope of the invention.

What is claimed is:

1. In combination:

a first counter circuit for dividing down an applied pulse train signal repetition rate by a first factor;

a second counter circuit for dividing down said applied signal by a second factor; said second factor being less than said first factor;

means for coupling said first and second counters for parallel counting operation by said applied signal when said second counter is operated by such signal;

means responsive to a predetermined count of said first counter for resetting said second counter to a predetermined count; and means responsive to a predetermined count of said second counter for inhibiting said second counter for a predetermined number of counts.

2. In combination, a first counter circuit for dividing down an applied pulse train signal repetition rate by a first factor, said first counter circuit being responsive to a control signal for inhibiting said first counter circuit, a second counter circuit for dividing down said applied signal by a second factor, said second factor being less than said first factor, means responsive to a predetermined count of said first counter for resetting said second counter to a predetermined count, means responsive to a predetermined count of said second counter for inhibiting said second counter for a predetermined number of counts, controllably circuit means, a logic circuit responsive to a received data signal for providing a framing signal and a plurality of command signals, means responsive to said command signals and to outputs of said second counter circuit for controlling said circuit means, and a framing circuit responsive to the exclusive occurrence of said framing signal or said predetermined count of said first counter circuit for providing said control signal.

3. The combination as defined in claim 2 in which:

said framing circuit includes means providing said control signal after a predetermined number of exclusive occurrences of said framing signal or said predetermined count of said first counter circuit.

4. The combination as defined in claim 3 in which means couple said control signal for resetting said framing circuit to provide said control signal after one exclusive occurrence of said framing signal or said predetermined count of said first counter circuit.

5. The combination as described in claim 2 in which said controllable circuit means includes a plurality of devices each responsive to an adjusting signal for performing a predetermined function, and said controlling means comprises a memory circuit for storing adjusting information for each of said plurality of devices, said memory circuit being responsive to said second counting circuit for sequentially providing said information, and an addressing matrix responsive to said second counting circuit and said memory circuit for sequentially applying said adjusting information to each of said devices.

6. The combination as defined in claim 5 in which said controlling means further comprises an up-down interposed between said memory circuit and said addressing matrix, said up-down counter being responsive to said command signals for incrementing or decrementing said up-down counter.

7. The combination as defined in claim 6 in which said controlling means further comprises a digital-to-analog converter interposed between said up-down counter and said addressing matrix for converting digital information to anolog form.

8. The combination as defined in claim 7 in which there are provided means responsive to outputs of said second counter for addressing said memory at a rate which is greater than the rate of occurrence of said command signals, means for reading out said memory circuit each time it is addressed, and means for enabling said memory circuit to be updated upon occurrence of said command signals.

9. In combination, a first counter circuit for dividing down an applied pulse train signal repetition rate by a first factor, a second counter circuit for dividing down said applied signal by a second factor, said second factor being less than said first factor, a plurality of controllably actuatable load devices, means coupled for actuating said load devices, means responsive to different count outputs of said second counter circuit for enabling actuation of said load devices by said actuating means in a predetermined sequence, means responsive to a predetermined count of said first counter for resetting said second counter to a predetermined count, and means responsive to a predetermined count of said second counter for inhibiting said second counter for a predetermined number of counts, 10. The combination in accordance with claim 9 in which there are provided means, including said inhibiting means and coupled to said actuating means, for modifying actuation of of different selected groups of said load devices in each cycle of said second counter circuit producing said second factor division of said applied signal and which cycles occur within a single cycle of said first counter circuit producing said first factor of division of said applied signal, means for deriving an output for said first counter circuit at a rate corresponding to a third division factor which is less than said second factor, and means for actuating said modifying means in response to the last-mentioned output of said first counter circuit, said third factor being proportioned with respect to said first and second factors so that modification of the actuation of each of said load devices by said modifying means is accomplished only once during a cycle of said first counter circuit producing said first division factor.

11. The combination in accordance with claim 10 in which said first counter circuit comprises a first frequency-dividing means for dividing down the repetition rate of said applied signal by said third factor, a second frequency-dividing means driven by said first dividing means for dividing down the repetition rate of the output of said first dividing means by said second factor, and third frequency-dividing means driven by said second dividing means for producing in cooperation with said first and second dividing means the division at said first factor.

12. The combination in accordance with claim 11 in which said means resetting said second counter comprises means for coupling an output corresponding to division by said first factor from said third dividing means to said second counter.

13. The combination in accordance with claim 10 in which said means for actuating said modifying means comprises a memory circuit for storing actuating information for each of said plurality of devices and responsive to said second counting circuit for sequentially providing said information, and an addressing matrix responsive to said second counting circuit and said memory circuit for sequentially applying said actuating information to each of said devices.

14. The combination in accordance with claim 13 in which said means for actuating said modifying means comprises means for supplying a digital signal comprising a succession of messages including a plurality of words comprising a message frame start word and additional words equal in number to the number of said devices and comprising modification information for actuation of said devices, and means responsive to said derived output of said first counter circuit for applying signals representing said words to said modifying means to effect modifications of said device actuations.

15. The combination in accordance with claim 14 in which said means for applying said word-representing signals comprises an up-down counter interposed between said memory circuit and said addressing matrix, said up-down counter being responsive to said word-representing signals for incrementing or decrementing said up-down counter.

16. The combination in accordance with claim 15 in which said means for actuating said modifying means further comprises a digital-to-analog converter interposed between said up-down counter and said addressing matrix for converting digital information to analog form.

* * * * *